United States Patent
Di et al.

(10) Patent No.: US 10,780,893 B2
(45) Date of Patent: Sep. 22, 2020

(54) SYSTEM AND METHOD FOR ESTIMATING THE LENGTH OF A TRAILER ATTACHED TO A VEHICLE

(71) Applicant: AUTOLIV ASP, INC., Ogden, UT (US)

(72) Inventors: Junru Di, Ann Arbor, MI (US); Debra Rice, Redford, MI (US)

(73) Assignee: VEONEER US, INC., Southfield, MI (US)

( * ) Notice: Subject to any disclaimer, the term of this patent is extended or adjusted under 35 U.S.C. 154(b) by 165 days.

(21) Appl. No.: 15/940,813

(22) Filed: Mar. 29, 2018

(65) Prior Publication Data

US 2019/0300005 A1    Oct. 3, 2019

(51) Int. Cl.
| | |
|---|---|
| *B60W 40/114* | (2012.01) |
| *B60R 1/00* | (2006.01) |
| *B62D 13/00* | (2006.01) |
| *B62D 15/02* | (2006.01) |
| *G01S 17/93* | (2020.01) |
| *G01S 17/931* | (2020.01) |
| *G01S 13/931* | (2020.01) |

(52) U.S. Cl.
CPC .......... *B60W 40/114* (2013.01); *B60R 1/003* (2013.01); *B62D 13/00* (2013.01); *B62D 15/0245* (2013.01); *G01S 17/931* (2020.01); *B60R 2300/301* (2013.01); *B60W 2520/22* (2013.01); *G01S 2013/9315* (2020.01)

(58) Field of Classification Search
CPC ............. B60R 1/003; B60R 2300/301; B60W 40/114; B60W 2520/22; B62D 13/00; B62D 15/0245; G01S 17/931; G01S 2013/9315
USPC ........................................................ 701/301
See application file for complete search history.

(56) References Cited

U.S. PATENT DOCUMENTS

| | | | | |
|---|---|---|---|---|
| 5,523,947 A | * | 6/1996 | Breen ................... | B60T 8/1708 280/400 |
| 7,239,958 B2 | * | 7/2007 | Grougan ................ | B62D 13/06 340/932.2 |
| 7,793,965 B2 | * | 9/2010 | Padula ................... | B62D 13/04 280/426 |
| 9,211,889 B1 | | 12/2015 | Hoetzer et al. | |
| 9,335,162 B2 | | 5/2016 | Kyrtsos et al. | |
| 9,623,904 B2 | * | 4/2017 | Lavoie .................. | B62D 13/06 |
| 9,804,022 B2 | * | 10/2017 | Kyrtsos ................. | G01H 17/00 |
| 9,836,060 B2 | * | 12/2017 | Ghneim .................... | B60R 1/12 |

(Continued)

*Primary Examiner* — Joshua E Rodden
(74) *Attorney, Agent, or Firm* — Dickinson Wright PLLC (57) ABSTRACT

A system and method for estimating the length of a trailer attached to a vehicle includes a processor and a sensor mounted to the vehicle and in communication with the processor. The sensor is configured to sense at least one target on the trailer and provide information to the processor regarding the location of the at least one target. The processor is configured to determine an estimate of the wheel based length ($laa_1$) of the trailer by utilizing a wheel angle ($\alpha$) of the vehicle, a hitch point (zk) of the vehicle, the first hitch angle ($\gamma_1$), a wheel base (lza) of the vehicle, a distance (lzk) between the hitch point (zk) and a front axle of vehicle, and a lane radius (rza). The processor is configured to determine the length of a trailer attached to the vehicle by utilizing the wheel based length ($laa_1$) of the trailer.

20 Claims, 11 Drawing Sheets

(56) References Cited

U.S. PATENT DOCUMENTS

| | | | |
|---|---|---|---|
| 2004/0130441 A1* | 7/2004 | Lee | B60D 1/58 |
| | | | 340/431 |
| 2005/0055138 A1* | 3/2005 | Lee | G05D 1/0891 |
| | | | 701/1 |
| 2014/0236532 A1* | 8/2014 | Trombley | G01B 21/02 |
| | | | 702/145 |
| 2014/0277942 A1* | 9/2014 | Kyrtsos | B60W 30/00 |
| | | | 701/41 |
| 2014/0297129 A1* | 10/2014 | Lavoie | B62D 13/06 |
| | | | 701/41 |
| 2016/0139599 A1* | 5/2016 | Czlapinski | G05D 1/0212 |
| | | | 701/41 |
| 2016/0362135 A1* | 12/2016 | Xu | B62D 15/021 |
| 2019/0086204 A1* | 3/2019 | Critchley | G01S 13/931 |

* cited by examiner

SYSTEM AND METHOD FOR ESTIMATING THE LENGTH OF A TRAILER ATTACHED TO A VEHICLE

BACKGROUND

1. Field of the Invention

The present invention generally relates to systems and methods for determining the length of a trailer behind a vehicle.

2. Description of Related Art

Vehicles, such as automobiles, have been equipped with radar systems for detecting objects such as other vehicles proximate to the host vehicle. This type of object detection is desirable so as to relay this information to the driver of the vehicle. For example, using data generated by the radar system, the driver of the vehicle may be informed that another vehicle is in their blind spot through the use of visual and/or audible feedback provided to the driver. Additionally, these radar systems can be utilized to provide information to the driver to prevent crashes with other vehicles, pedestrians, animals, or other objects. Further, this information can be relayed to the vehicles braking, steering and/or other vehicle systems so as to actively prevent the vehicle from crashing into one or more objects.

However, if a trailer is connected to the vehicle, these radar systems and the information provided to the driver or other vehicle systems must be modified so as to consider the presence and length of the trailer located behind the vehicle. For example, changing lanes without a trailer connected to the vehicle may be acceptable so long as the trailer is not present but may be unacceptable if the trailer is present, as the trailer significantly increases the area needed to change lanes safely. Furthermore, the length of the trailer can also impact the acceptability of changing lanes. For example, it may be acceptable to change lanes when a shorter trailer is attached to the vehicle, but unacceptable to change lanes when a longer trailer is attached to the vehicle.

SUMMARY

A system and method for estimating the length of a trailer attached to a vehicle includes a processor and a sensor mounted to the vehicle and in communication with the processor. The sensor is configured to sense at least one target on the trailer and provide information to the processor regarding the location of the at least one target. The processor is configured to determine an estimate of the wheel based length ($laa_1$) of the trailer by utilizing a wheel angle ($\alpha$) of the vehicle, a hitch point (zk) of the vehicle, the first hitch angle ($\gamma_1$), a wheel base (lza) of the vehicle, a distance (lzk) between the hitch point (zk) and a front axle of vehicle, and a lane radius (rza). The processor is configured to determine the length of a trailer attached to the vehicle by utilizing the wheel based length ($laa_1$) of the trailer.

Further objects, features, and advantages of this invention will become readily apparent to persons skilled in the art after a review of the following description, with reference to the drawings and claims that are appended to and form a part of this specification.

DETAILED DESCRIPTION

Figure 1:
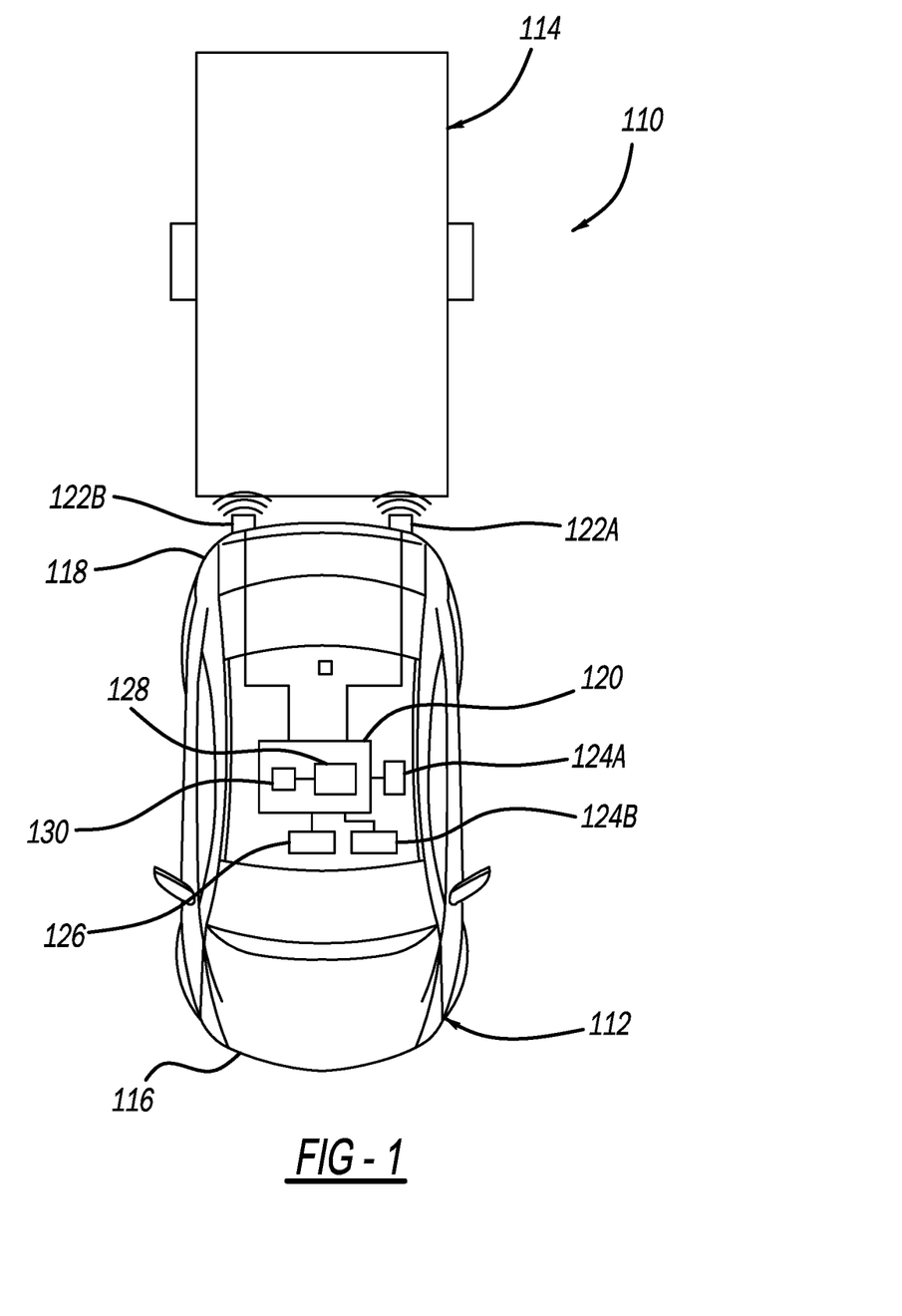
FIG. 1 illustrates a system for estimating the length of a trailer attached to a vehicle.

Referring to FIG. 1, an overhead view 110 of a vehicle 112 connected to a trailer 114 is shown. It should be understood that the vehicle 112 could be any vehicle capable of transporting persons or objects from one point to another. As such, the vehicle 112 could be an automobile, a sport utility vehicle, truck, commercial vehicle, and the like. However, the vehicle 112 could also be agricultural equipment, such as a tractor, or other commercial or industrial vehicle 112.

As to the trailer 114, the term "trailer" should be interpreted broadly. Here, the trailer 114 is a flatbed trailer, but the trailer 114 may be any device having at least one wheel, and that is capable of being selectively attached to the vehicle 112. As such, the trailer 114 could also be a wagon, enclosed trailer, shipping trailer, or even a recreational trailer having living compartments located inside. Again, it should be understood that these are merely a few examples of what may comprise the vehicle 112 and the trailer 114.

Generally, the vehicle 112 has a forward section 116 and a rearward section 118. The rearward section 118 may include sensors 122A and 122B located and configured such to detect objects generally behind the vehicle 112. Alternatively, it should be understood that the rearward section 118 may have only one sensor 122A or 122B or may have more than two sensors. The sensors 122A and/or 122B may be any one of a number of different sensor capable of detecting objects. As such, the sensors 122A and/or 122B may be radar sensors or sensors capable of sending sonic or ultrasonic signals. Any objects receiving these radar signals generally bounce these signals back to the sensors 122A and/or 122B. This returned signal, when properly processed, can be utilized to determine the presence of an object or objects. Furthermore, the sensors 122A and/or 122B may be one or more cameras or could be a Light Detection and Ranging ("LIDAR") sensor system. Again, it should be understood that any type of sensor could be utilized so long as it is capable of detecting an object.

Here, the vehicle 112 includes a system 120 for determining the length of the trailer 114 located behind the vehicle 112. The processor 120 includes a processor 128 in communication with a memory unit 130. The processor 128 may be a single standalone processor or may be multiple processors working in concert. The processor 128 can be two separate processors processing information from sensors 122A and 122B individually or in a combined model. The memory unit 130 includes instructions for performing methods disclosed later in this specification. The memory 130 may be any memory device capable of storing digital information. As such, the memory unit 130 may be a solid state device, a magnetic device, an optical device, or the like. Additionally, it should be understood that the memory unit 130 may be separate and apart from the processor 128 or may be integrated within the processor 128.

The vehicle 112 may also include a variety of different sensors for sensing the movement of the vehicle 112. For example, the sensor 124A may be an accelerometer capable of determining acceleration, velocity, and/or distance traveled by the vehicle 112. The sensor 124A may also be able to determine a yaw rate of the vehicle 112. The vehicle 112 may also include other sensors 124B, which may be able to determine the steering wheel angle of the vehicle 112, the wheel speed of one or more wheels of the vehicle 112, or other vehicle-related information. These sensors 124A and/or 124B are in communication with the processor 128 and provide a plurality of signals to the processor 128. It should be understood that the data generated by the sensors 124A and/or 124B may be directed provided to the processor 120 or may be provided to the processor 120 via another vehicle subsystem that first receives the data from the sensors 124A and/or 124B and determines acceleration, velocity, distance, yaw rate, steering angle, wheel speed, etc.

The vehicle 112 may also include an output device 126 for providing information to either the operator of the vehicle 112 by visual and/or audible cues or provide information to other vehicle systems. As such, the determinations made by the processor 120 would be provided directly or through further processing such as blind spot monitor system to the output device 126 so as to assist the driver when a trailer 114 is located behind the vehicle 112 and/or the length of the trailer 114.

Figure 2:
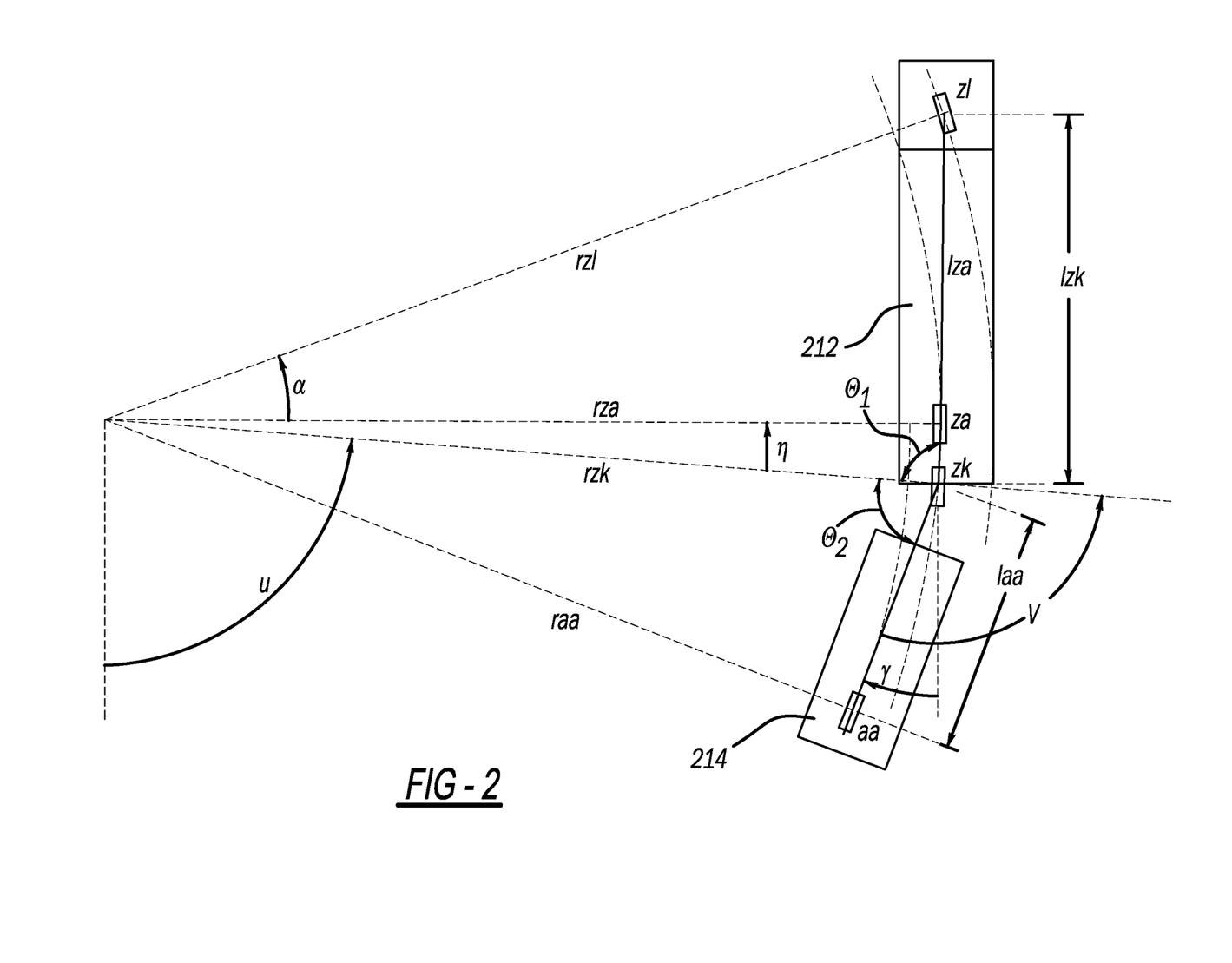
FIG. 2 illustrates a diagram of the bicycle model for estimating the length of a trailer attached to a vehicle.
Figure 3A:
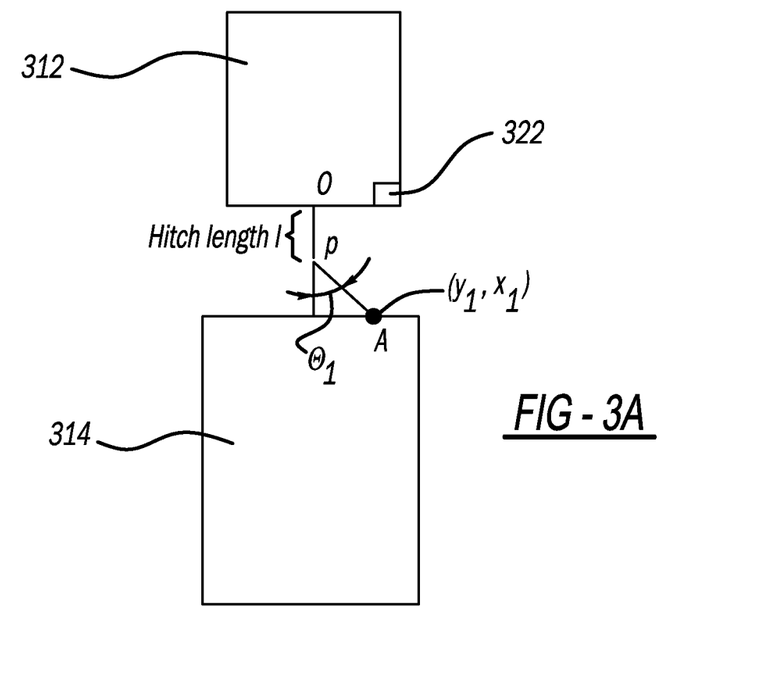
FIGS. 3A and 3B illustrate a diagram regarding estimating the length of the trailer utilizing information when the vehicle is traveling straight and turning, respectively.
Figure 3B:
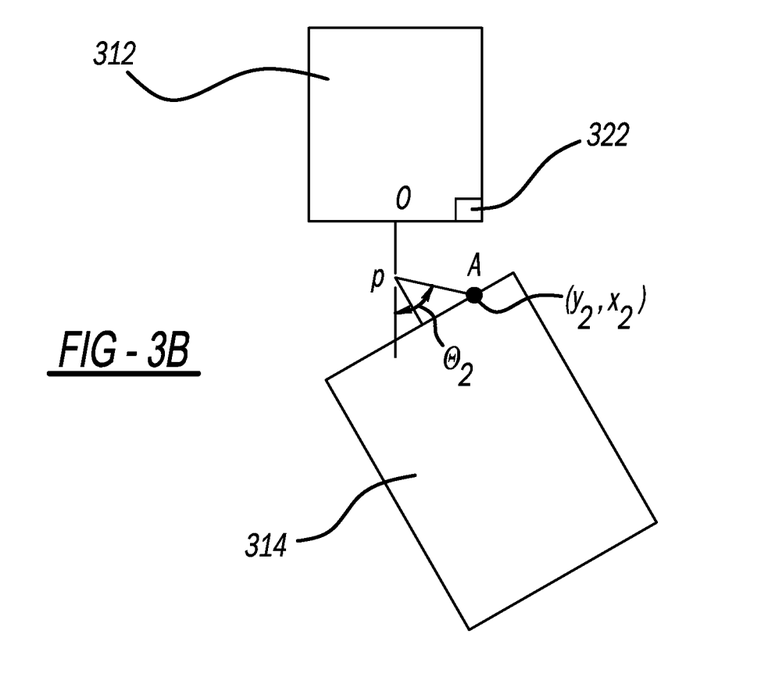

Referring to FIG. 2, a schematic view of the vehicle 212 and the trailer 214 is shown. It should be understood that like reference numerals will be utilized to refer to like elements with the exception that they will be increased by 100 to match the figure number. So, for example, the trailer 114 will be element 214 in FIG. 2 and will be element 314 in FIG. 3.

Here, a bicycle model for determining the length of the trailer 214 is shown. In order to understand the bicycle model, the following variables (and description) shown in FIG. 2 and referenced throughout this specification will be utilized:

α: wheel angle (wheel angle);
zk: hitch point;
γ: hitch angle;
lza: wheel base vehicle length;
lzk: distance between hitch point and front axle of vehicle;
laa: distance between hitch point and axle of trailer; and
rza: lane radius (calculate from vehicle dynamic information).

The turning radius is perpendicular to the vehicle 212 back axle and trailer axle. Based on the Pythagorean theorem, the relationship between the wheel based length (laa) of the trailer and lane radius (rza) are:

$$rzk = \sqrt{rza^2 + (lzk - lza)^2} \quad (1)$$

$$\pi = \theta_1 + \theta_2 + \gamma \quad (2)$$

$$\theta_1 = \cos^{-1}\frac{lzk - lza}{rzk} \quad (3)$$

$$\theta_2 = \cos^{-1}\frac{laa}{rzk} \quad (4)$$

$$\alpha = \tan^{-1}\frac{lza}{rzk}. \quad (5)$$

The wheel based to trailer length (laa) of the trailer can then be derived from equation 4 as follows:

$$laa = rzk \cdot \cos\theta_2, \text{ where} \quad (6)$$

$$\theta_2 = \pi - \gamma - \cos^{-1}\frac{lzk - lza}{rzk}. \quad (7)$$

Referring to FIGS. 3A and 3B, two separate representations of the vehicle 312 and the trailer 314 are shown. In FIG. 3A, the vehicle 312 and the trailer 314 are traveling straight. In FIG. 3B, the vehicle 312 and the trailer 314 are turning. These figures illustrate a target A. In FIG. 3A, the target A is located at position $A(y_1, x_1)$, while the target A in FIG. 3B is located at position $A(y_2, x_2)$.

The processor 120 of FIG. 1 is configured to determine a first position ($A(y_1, x_1)$) of a first target A of the trailer 314 when the vehicle 312 is traveling straight based on information from the sensor 322. Referring to FIG. 3B, the processor 120 of FIG. 1 being configured to determine a second position ($A(y_2, x_2)$) of the first target A of the trailer 314 when the vehicle 312 is turning based on information from the sensor 322.

In order to determine the hitch angle (γ), the processor 122 utilizes the first position ($A(y_1, x_1)$) of the first target, the second position ($A(y_2, x_2)$) of the first target, a hitch length (l) and a pivot point (P).

The processor 120 of FIG. 1 determines a first estimate of the wheel based length (laa) of the trailer by utilizing a wheel angle (α) of the vehicle, a hitch point (zk) of the vehicle, the hitch angle (γ), a wheel base (lza) of the vehicle, a distance (lzk) between the hitch point (zk) and a front axle of vehicle, and a lane radius (rza). From there, the processor 120 of FIG. 1 is configured to estimate the length of a trailer attached to the vehicle by utilizing the wheel based length (laa) of the trailer.

In order to determine the hitch angle (γ), the processor 120 of FIG. 1 determines a first angle ($\theta_1$) of the first position ($A(y_1, x_1)$) of the first target with respect to the pivot point (P) and a second angle ($\theta_2$) of the second position ($A(y_2, x_2)$) of the first target with respect to the pivot point (P). From there, the processor 120 is configured to determine the hitch angle (γ) by calculating the difference between the first angle ($\theta_1$) and the second angle ($\theta_2$).

As stated before, the processor 120 of FIG. 1 is configured to determine the length of a trailer attached to the vehicle by utilizing the wheel based length (laa) of the trailer. In one such example, the processor 120 is configured to estimate the length of the trailer by multiplying the wheel based length (laa) of the trailer by a correction factor. As it is generally well known, trailers usually have a portion that extends beyond their wheelbase. As such, if one knows the wheel based length (laa) of the trailer, one can simply multiply this length by a correction factor. This correction factor can be any type of factor suitable for adjusting the wheelbase length (laa) of the trailer to come to the estimated length of the trailer. In one such example, the correction factor may be between 1.0 and 2.0. In another example, the correction factor may be 1.5. Again, any correction factor can be utilized so as to estimate the length of the trailer.

The processor 120 of FIG. 1 may estimate the length of the trailer at one or multiple iterations. Furthermore, in one example, the processor 120 may be configured to estimate the length of the trailer 314 attached to the vehicle 312 during every turning cycle of the vehicle 312.

Figure 4:
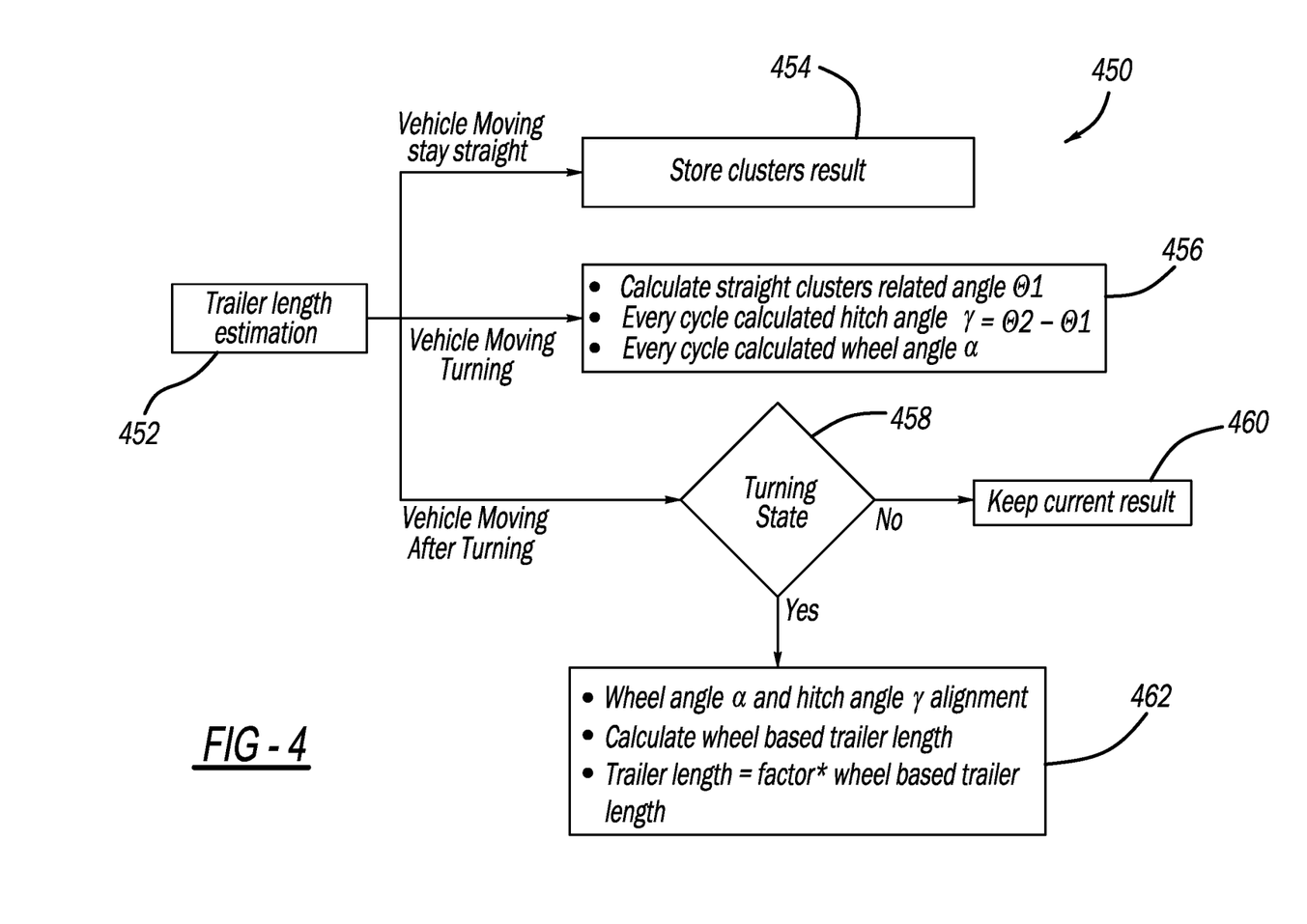
FIG. 4 illustrates a method for estimating the length of the trailer.

For example, referring to FIG. 4, a method 450 is shown regarding when the length of the trailer is estimated. In step 452 a decision is made whether the vehicle is traveling straight, turning, or moving after turning. If the vehicle is traveling straight, of the plurality of measurements of the target A are taken by the sensor and stored. These plurality of measurements may be referred to as clusters. This will be described in greater detail in later portions of this detailed description section.

In step 456, if a determination is made that the vehicle is turning, the method calculates straight clusters related to the angle $\theta_1$ and determines the hitch angle ($\gamma$) and calculates the wheel angle ($\alpha$).

In step 458, a determination is made if the vehicle was engaged in a sharp enough turn (e.g., turn state>x degrees). By "sharp enough" turn, this could be defined as a turn being somewhere between 30° and 100°. If the vehicle is not in a sharp enough turn, the current result is stored as shown in step 460. However, if the vehicle is in a sharp turning, the wheel angle and the wheel angle ($\alpha$) and the hitch angle ($\gamma$) is aligned. This alignment will be described later in this detailed description section. From there, a calculation regarding the wheelbase trailer length is performed and an estimate of the trailer length is performed by multiplying the wheel based trailer length (laa) by the correction factor.

Figure 5A:
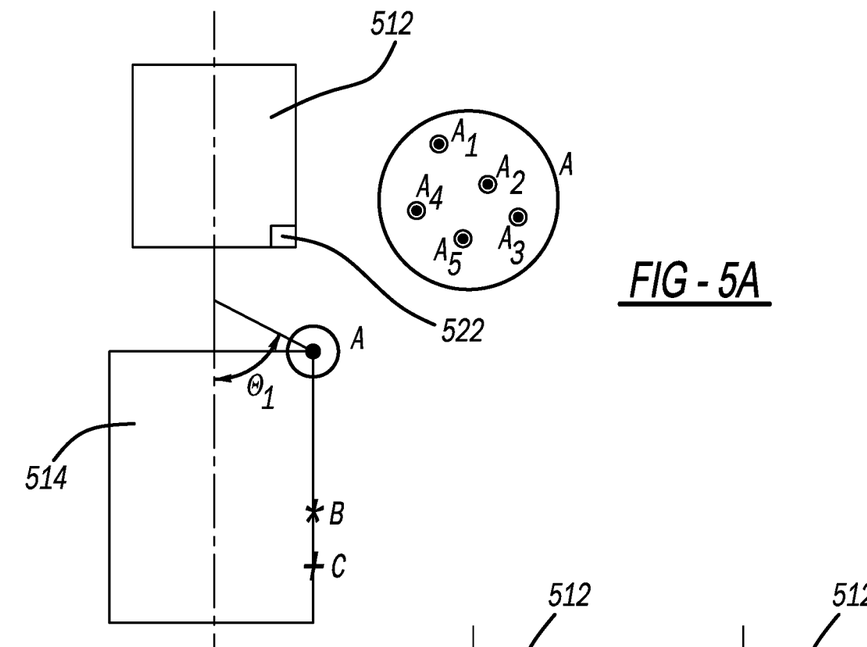
FIGS. 5A, 5B, and 5C illustrate a diagram regarding estimating the length of the trailer utilizing multiple targets when the vehicle is traveling straight and turning.

Referring to FIG. 5A, here is shown a diagram of the vehicle 512 towing the trailer 514. Additionally shown are three targets—A, B, and C. As for target A, the sensor 522 may be configured to take multiple measurements of the location of target A. By taking multiple measurements of the location of target A, referred to as clusters, the processor 120 of FIG. 1 can utilize these multiple measurements or cluster of measurements so as to come up with a more precise location of target A. For example, the processor 120 may be configured so as to average these multiple locations of target A or perform some type of filtering so as to better determine the location of target A.

Figure 5B:
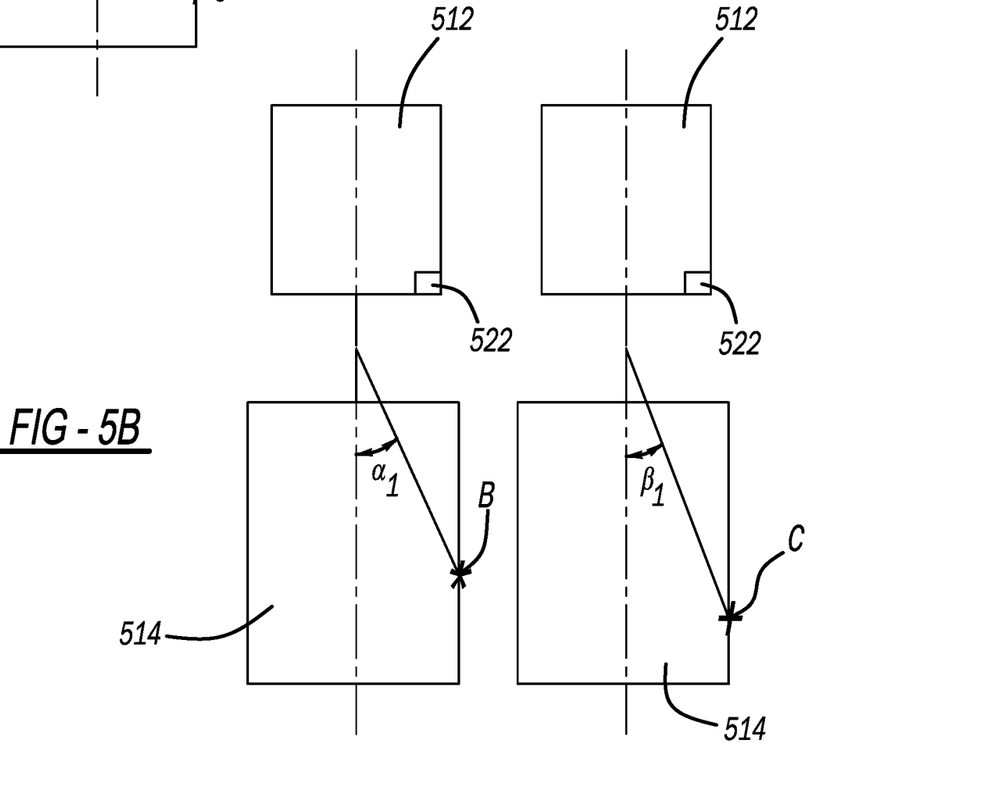
Figure 5C:
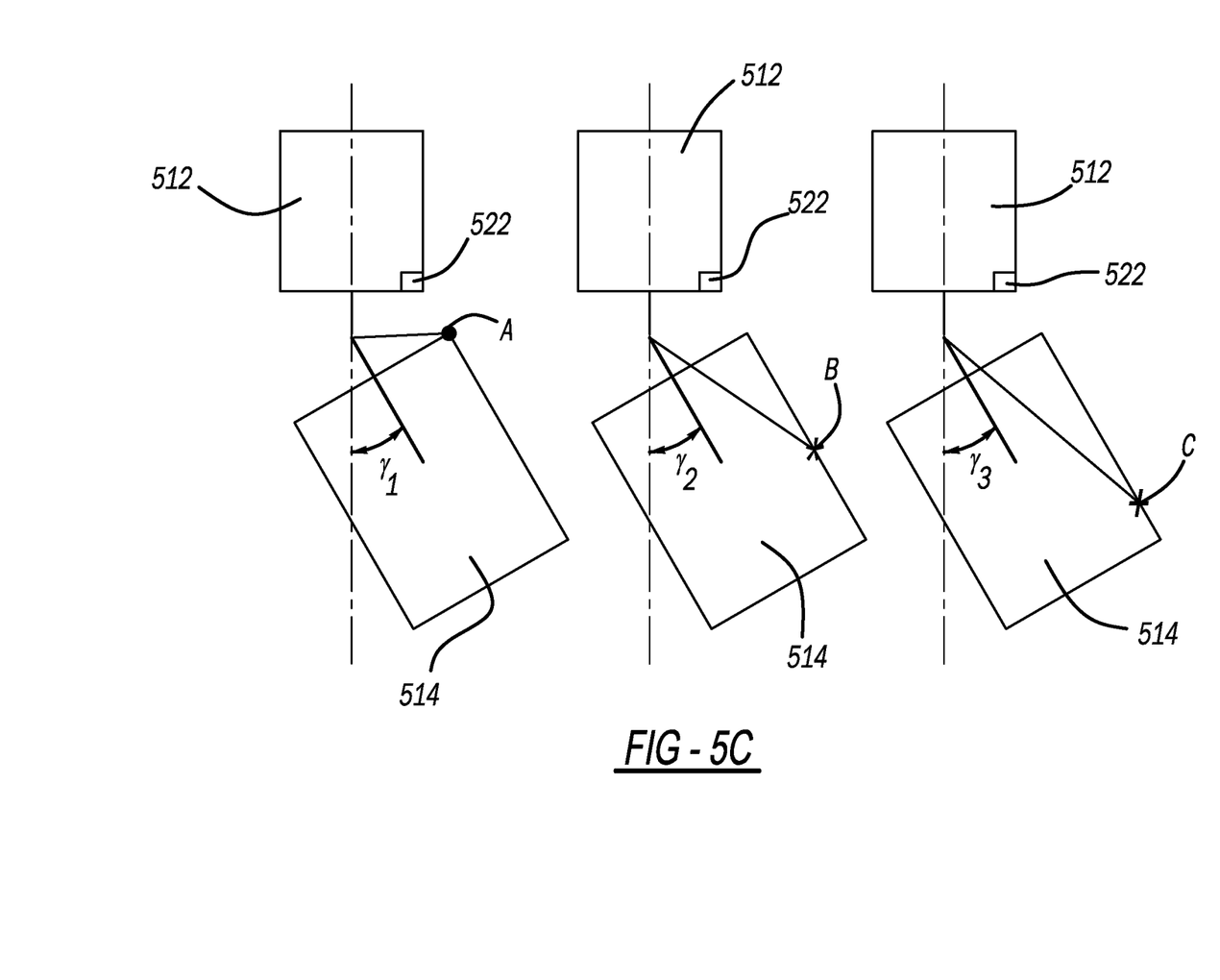

Referring to FIGS. 5B and 5C, these figures each show a vehicle 512 towing a trailer 514. In these examples, the processor 120 of FIG. 1 is configured to look for positions at different targets, not just target A. So, in these examples, the processor 120 also looks for the positions of targets B and C. The purpose for looking at multiple targets is so as to be able to compute multiple hitch angles. By being able to compute multiple hitch angles, multiple wheel based length estimates of the trailer 514 can be performed. In turn, that means a filtered wheel based length estimate can be determined. This filtering of the wheel based length estimate based on different targets trailer results in a more accurate wheelbase length estimate.

As such, similar to before, the processor 120 of FIG. 1 is configured to determine a first position ($B(y_1, x_1)$) of a second target B of the trailer 514 when the vehicle 512 is traveling straight based on information from the sensor 522 and determine a second position ($B(y_2, x_2)$) of the second target B of the trailer 514 when the vehicle 512 is turning based on information from the sensor 522. From there, the processor 120 is configured to determine a first angle ($\alpha_1$) of the first position ($B(y_1, x_1)$) of the second target with respect to the pivot point (P), determine an second angle ($\alpha_2$) of the second position ($B(y_2, x_2)$) of the second target with respect to the pivot point (P), and determine a second hitch angle ($\gamma_2$) by calculating the difference between the first angle ($\alpha_1$) and the second angle ($\alpha_2$). Thereafter, the processor 120 is configured to determine a second estimate of the wheel based length ($laa_2$) of the trailer by utilizing a wheel angle ($\alpha$) of the vehicle, a hitch point (zk) of the vehicle, the second hitch angle ($\gamma_2$), a wheel base (lza) of the vehicle, a distance (lzk) between the hitch point (zk) and a front axle of vehicle, and a lane radius (rza).

Similarly, with regard to target C, the processor 120 is configured to determine a first position ($C(y_1, x_1)$) of a third target C of the trailer 514 when the vehicle 512 is traveling straight based on information from the sensor 522 and determine a second position ($C(y_2, x_2)$) of the third target C of the trailer 514 when the vehicle 512 is turning based on information from the sensor 522. Thereafter, the processor 120 is configured to determine a first angle ($\beta_1$) of first position ($C(y_1, x_1)$) with respect to the pivot point (P), determine an second angle ($\beta_2$) of the second position ($C(y_2, x_2)$) with respect to the pivot point; and determine the hitch angle ($\gamma_3$) by calculating the difference between the first angle ($\beta_1$) and the second angle ($\beta_2$). From there, the processor 120 is configured to determine a third estimate of the wheel base length ($laa_3$) of the trailer by utilizing a wheel angle ($\alpha$) of the vehicle, a hitch point (zk) of the vehicle, the third hitch angle ($\gamma_3$), a wheel base (lza) of the vehicle, a distance (lzk) between the hitch point (zk) and a front axle of vehicle, and a lane radius (rza).

Using these multiple wheel based lengths ($laa_1$, $laa_2$, $laa_3$), the processor is configured to determine a filtered estimate of the wheel based length ($laa_F$) by utilizing at least one of the first estimate of the wheel based length ($laa_1$), the second estimate of the wheel based length ($laa_2$), and the third estimate of the wheel based length ($laa_3$). From there, the a filtered estimate of the wheel based length ($laa_F$) may be multiplied by the correction factor so as to estimate the overall length of the trailer 514.

Figure 6:
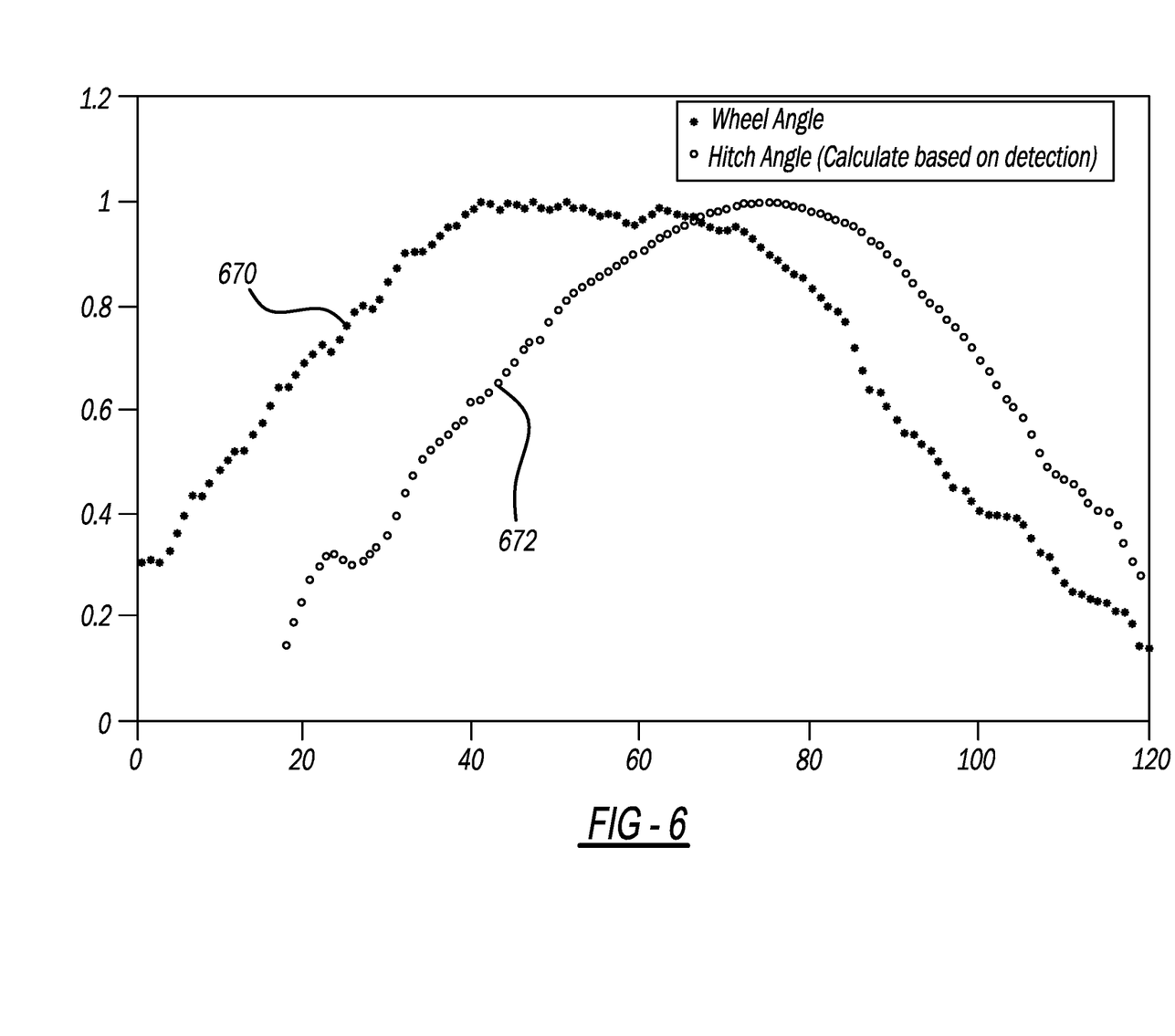
FIG. 6 is a graph showing the misalignment between the wheel angle and the hitch angle.

As stated previously, the processor 120 of FIG. 1 may be further configured to perform an alignment between the hitch angle ($\gamma$) and the wheel angle ($\alpha$). As shown in FIG. 6, the hitch angle 672 generally lags behind the wheel angle 670. This is generally because the vehicle and attached trailer do not turn immediately as does the angle of the wheel does. So, as the vehicle and therefore the trailer enters into the turn, the hitch angle ($\gamma$) will eventually match or generally match the wheel angle ($\alpha$).

Figure 7A:
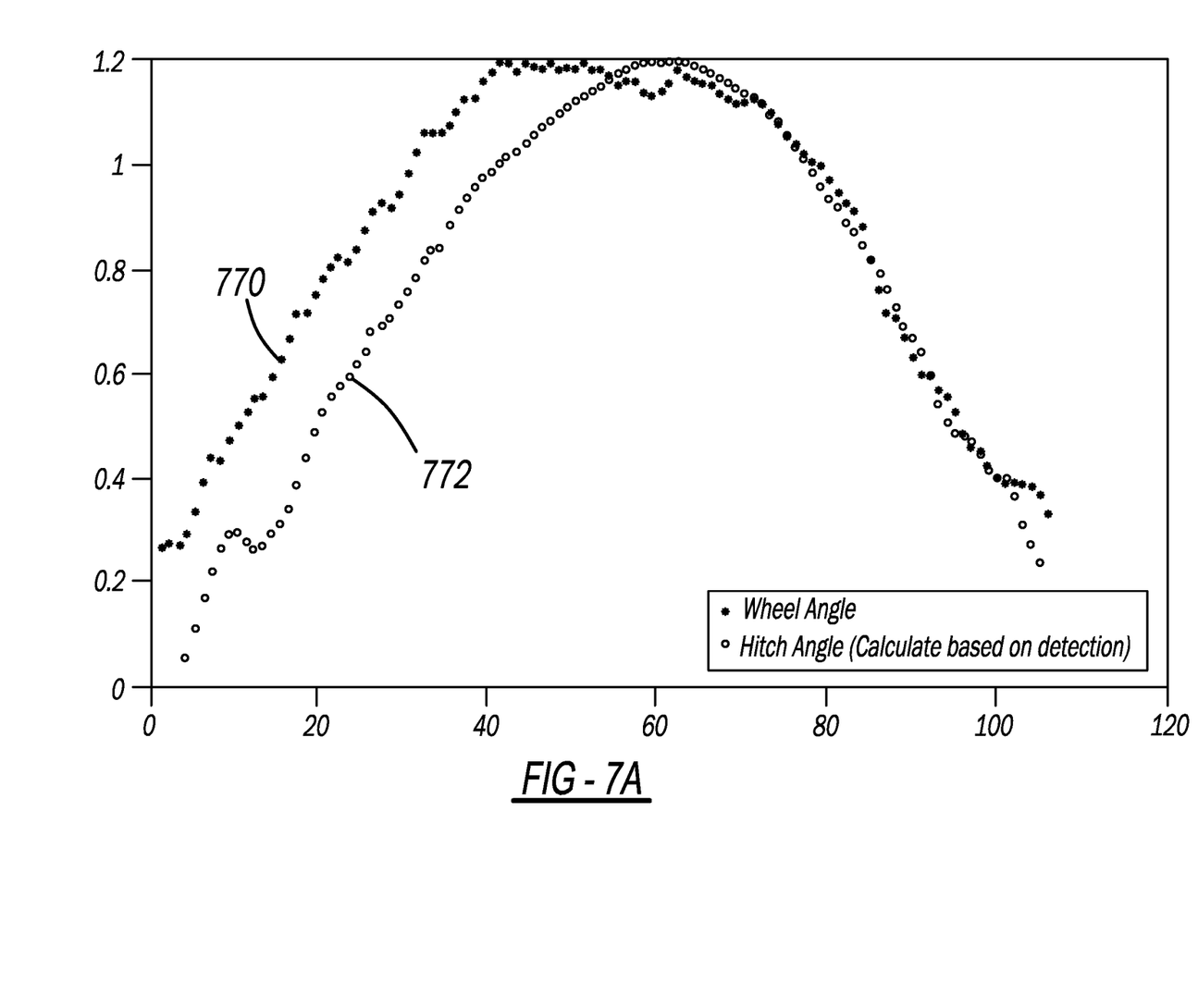
FIGS. 7A and 7B illustrate a graph showing the results of an alignment methodology that utilizes a fixed correction factor.
Figure 7B:
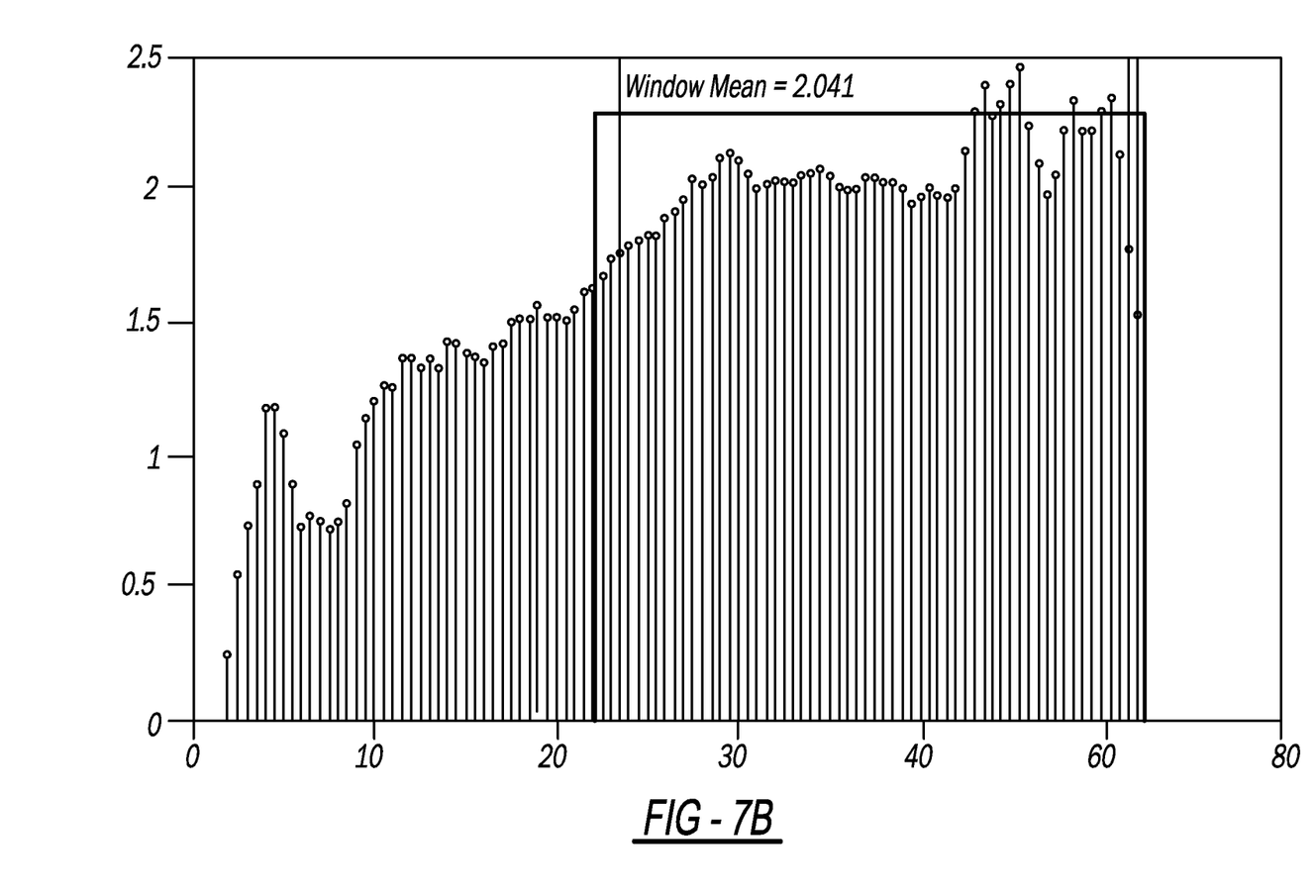

In order to align the hitch angle to the wheel angle any one of a number of different methodologies could be utilized. For example, the processor 120 may be configured so as to shift the hitch angle so as to better match the wheel angle using a fixed value. This type of methodology is shown in FIG. 7A. FIG. 7B generally shows that over time this methodology results in a fairly accurate alignment.

Figure 8A:
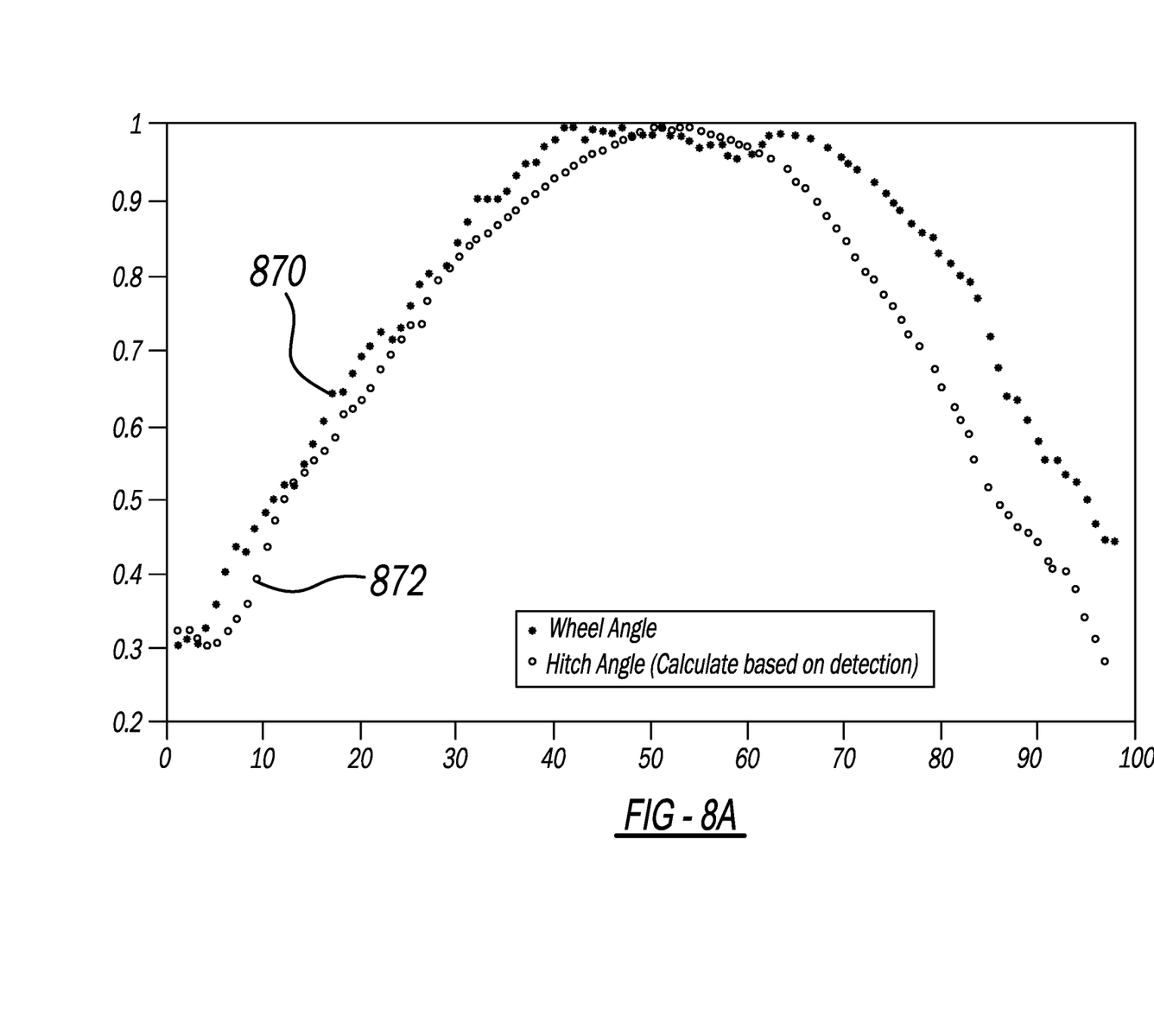
FIGS. 8A and 8B illustrate a graph showing the results of an alignment methodology that utilizes a correlation function.
Figure 8B:
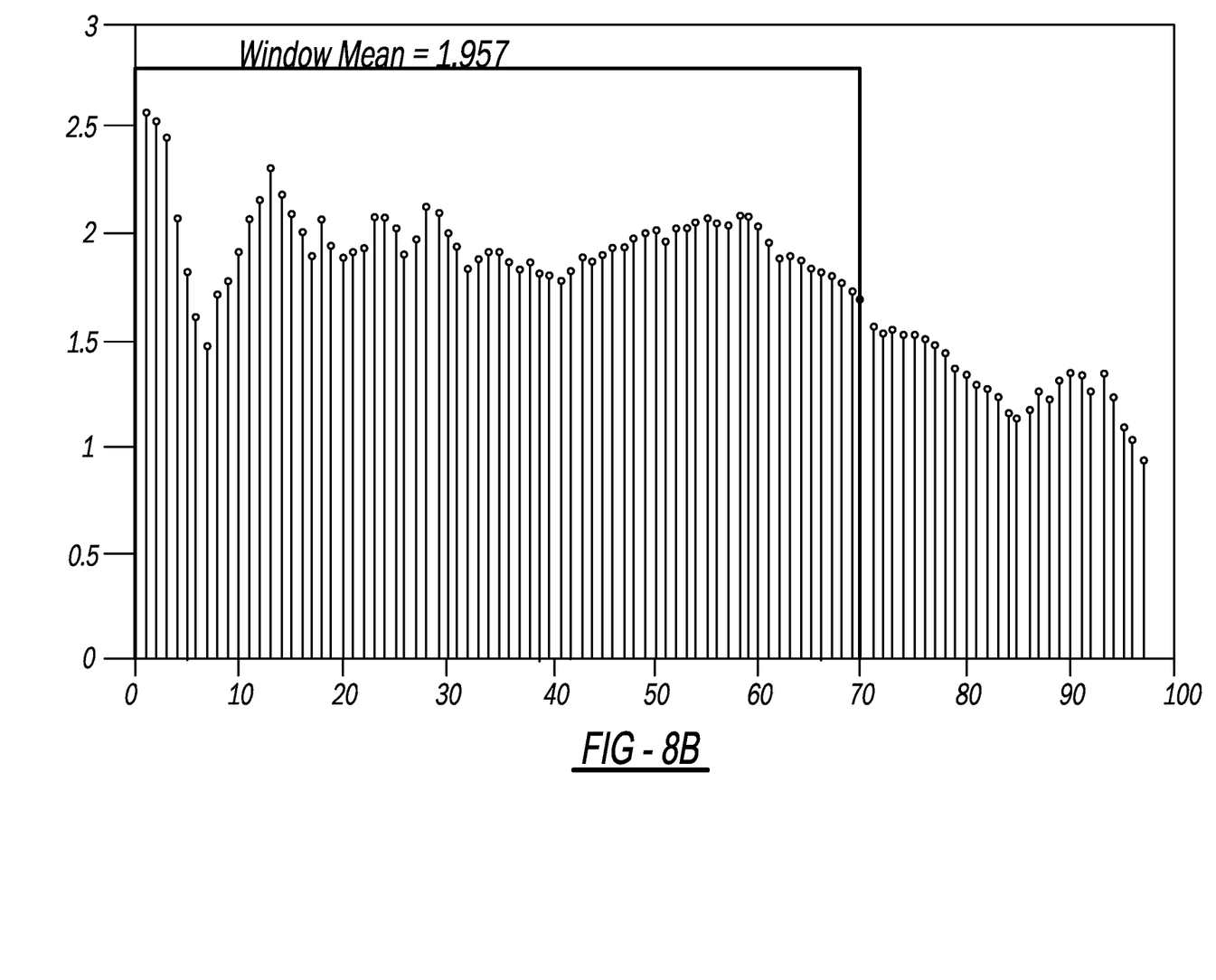

FIGS. 8A and 8B illustrate another methodology for aligning the hitch angle ($\gamma$) and the wheel angle ($\alpha$). Here, the processor 120 is configured to align the hitch angle ($\gamma$) and the wheel angle ($\alpha$) by using a correlation function. The correlation function between wheel angle f[m] and hitch angle g[m] May be:

$$(f*g)[n] = \sum_{m=-\infty}^{\infty} f[m]g[m+n], \text{ try } n \in (-m,m), \text{ when maximum of } (f*g)[n] \text{ is found, } n \text{ is the number of alignment cycles}$$

As shown in FIG. 8B, the use of this correlation function generally shows very close alignment between the two angles, especially in the early cycles of the turning of the vehicle. Again, these are but two examples of methodologies used to align the hitch angle and the wheel angle. Any type of methodology that is appropriate could be utilized.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Further the methods described herein may be embodied in a computer-readable medium. The term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

As a person skilled in the art will readily appreciate, the above description is meant as an illustration of the principles of this invention. This description is not intended to limit the scope or application of this invention in that the invention is susceptible to modification, variation, and change, without departing from the spirit of this invention, as defined in the following claims.

The invention claimed is:

1. A system to estimate a length of a trailer attached to a vehicle, the system comprising:
    a processor;
    a sensor mounted to the vehicle and in communication with the processor, the sensor configured to sense at least one target on the trailer and provide information to the processor regarding a location of the at least one target;
    the processor being configured to determine a first position ($A(y_1, x_1)$) of a first target of the at least one target of the trailer when the vehicle is traveling straight based on information from the sensor;
    the processor being configured to determine a second position ($A(y_2, x_2)$) of the first target of the trailer when the vehicle is turning based on information from the sensor;
    the processor being configured to determine a first hitch angle ($\gamma_1$) by utilizing the first position ($A(y_1, x_1)$) of the first target, the second position ($A(y_2, x_2)$) of the first target, a hitch length (l), and a pivot point (P);
    the processor being configured to determine a first estimate of a wheel based length ($laa_1$) of the trailer by utilizing a wheel angle ($\alpha$) of the vehicle, a hitch point (zk) of the vehicle, the first hitch angle ($\gamma_1$), a wheel base (lza) of the vehicle, a distance (lzk) between the hitch point (zk) and a front axle of vehicle, and a lane radius (rza); and
    the processor being configured to determine the length of the trailer attached to the vehicle by utilizing the wheel based length ($laa_1$) of the trailer.

2. The system of claim 1, further comprising the processor is configured to estimate the length of the trailer attached to the vehicle during every one of a plurality of turning cycle of the vehicle.

3. The system of claim 1, further comprising the processor is configured to:
    determine a first angle ($\theta_1$) of the first position ($A(y_1, x_1)$) of the first target with respect to the pivot point (P);
    determine a second angle ($\theta_2$) of the second position ($A(y_2, x_2)$) of the first target with respect to the pivot point (P); and
    determine the first hitch angle ($\gamma_1$) by calculating a difference between the first angle ($\theta_1$) and the second angle ($\theta_2$).

4. The system of claim 3, further comprising the processor is configured to:
    determine the first angle ($\theta_1$) by utilizing a cluster of the first positions ($A(y_1, x_1)$) to the first target with respect to the pivot point (P); and
    determine the second angle ($\theta_2$) by utilizing the second position ($A(y_2, x_2)$) to the first target with respect to the pivot point (P).

5. The system of claim 3, further comprising the processor is configured to:
    determine a first position ($B(y_1, x_1)$) of a second target of the at least one target of the trailer when the vehicle is traveling straight based on information from the sensor;
    determine a second position ($B(y_2, x_2)$) of the second target of the trailer when the vehicle is turning based on information from the sensor;
    determine a first angle ($\alpha_1$) of the first position ($B(y_1, x_1)$) of the second target with respect to the pivot point (P);
    determine a second angle ($\alpha_2$) of the second position ($B(y_2, x_2)$) of the second target with respect to the pivot point (P);
    determine a second hitch angle ($\gamma_2$) by calculating a difference between the first angle ($\alpha_1$) and the second angle ($\alpha_2$); and
    the processor being configured to determine a second estimate of the wheel based length ($laa_2$) of the trailer by utilizing the wheel angle ($\alpha$) of the vehicle, the hitch point (zk) of the vehicle, the second hitch angle ($\gamma_2$), the wheel base (lza) of the vehicle, the distance (lzk) between the hitch point (zk) and a front axle of vehicle, and the lane radius (rza).

6. The system of claim 5, further comprising the processor is configured to:
    determine a first position ($C(y_1, x_1)$) of a third target of the at least one target of the trailer when the vehicle is traveling straight based on information from the sensor;
    determine a second position ($C(y_2, x_2)$) of the third target of the trailer when the vehicle is turning based on information from the sensor;
    determine a first angle ($\beta_1$) of the first position ($C(y_1, x_1)$) of the third target with respect to the pivot point (P);
    determine a second angle ($\beta_2$) of the second position ($C(y_2, x_2)$) of the third target with respect to the pivot point (P); and
    determine a hitch angle ($\gamma_3$) by calculating a difference between the first angle ($\beta_1$) and the second angle ($\beta_2$);

determine a third estimate of the wheel base length ($laa_3$) of the trailer by utilizing the wheel angle ($\alpha$) of the vehicle, the hitch point (zk) of the vehicle, the third hitch angle ($\gamma_3$), the wheel base (lza) of the vehicle, the distance (lzk) between the hitch point (zk) and a front axle of vehicle, and the lane radius (rza).

7. The system of claim 6, further comprising the processor is configured to determine a filtered estimate of the wheel based length ($laa_F$) by utilizing at least one of the first estimate of the wheel based length ($laa_1$), the second estimate of the wheel based length ($laa_2$), and the third estimate of the wheel based length ($laa_3$).

8. The system of claim 2, further comprising the processor is configured to:

determine a hitch point radius (rzk), wherein the hitch point radius (rzk) is $$rzk = \sqrt{rza^2 + (lzk - lza)^2} \text{ ; wherein}$$

$$\pi = \theta_1 + \theta_2 + \gamma; \text{ wherein}$$

$$\theta_1 = \cos^{-1}\frac{lzk - lza}{rzk}; \text{ wherein}$$

$$\theta_2 = \cos^{-1}\frac{laa}{rzk}; \text{ and}$$

wherein $$\alpha = \tan^{-1}\frac{lza}{rzk}.$$

9. The system of claim 8, further comprising the processor is configured to:

determine the wheel based trailer length ($laa_1$), wherein the wheel based trailer length (laa) is:

$$laa = rzk \cdot \cos\theta_2, \text{ where}$$

$$\theta_2 = \pi - \gamma - \cos^{-1}\frac{lzk - lza}{rzk}.$$

10. The system of claim 9, further comprising the processor is configured to estimate the length of the trailer, wherein the estimate of the length of the trailer is the wheel based trailer length ($laa_1$) multiplied by a correction factor.

11. The system of claim 10, further comprising the correction factor is between 1.0 and 2.

12. The system of claim 11, further comprising the correction factor is 1.5.

13. The system of claim 1, further comprising a wheel angle sensor mounted to the vehicle and being in communication with the processor, the wheel angle sensor being configured to measure the wheel angle of the vehicle.

14. The system of claim 1, further comprising the processor is further configured to align the first hitch angle ($\gamma_1$) and the wheel angle ($\alpha$).

15. The system of claim 14, further comprising the processor is configured to align the hitch angle ($\gamma_1$) and the wheel angle ($\alpha$) by using a fixed value.

16. The system of claim 15, further comprising the processor is configured to align the hitch angle ($\gamma_1$) and the wheel angle ($\alpha$) by using a correlation function.

17. The system of claim 16, further comprising the correlation function between wheel angle f[m] and hitch angle g[m] is:

$$(f*g)[n] = \Sigma_{m=-\infty}^{\infty} f[m]g[m+n], \text{ try } n \in (-m, m),$$

when maximum of (f*g)[n] is found, n is the number of alignment cycles.

18. The system of claim 1, further comprising the sensor is an ultrasonic sensor.

19. The system of claim 1, further comprising the sensor is one or more cameras.

20. The system of claim 1, further comprising the sensor is a LIDAR sensor.

* * * * *